United States Patent [19]

King et al.

[11] Patent Number: 4,997,101

[45] Date of Patent: Mar. 5, 1991

[54] SINGLE HANDLE LID OPENING, CLOSING AND LOCKING MECHANISM FOR A LARGE CAPACITY PRESSURE COOKER

[75] Inventors: James D. King, Dayton; Stephen D. Werts, Eaton, both of Ohio

[73] Assignee: Henny Penny Corporation, Eaton, Ohio

[21] Appl. No.: 403,589

[22] Filed: Sep. 6, 1989

[51] Int. Cl.$^5$ .............................................. B65D 45/00
[52] U.S. Cl. .................................... 220/318; 220/314; 99/407; 292/257
[58] Field of Search ................ 220/315, 316, 318, 211, 220/262, 363, 314, 329; 126/369; 292/259, 257, DIG. 12

[56] References Cited

U.S. PATENT DOCUMENTS

| | | | |
|---|---|---|---|
| 2,227,712 | 1/1941 | Hackley | 292/257 |
| 2,529,478 | 11/1950 | Bach | 220/263 |
| 3,045,861 | 7/1962 | Dieter et al. | 220/257 X |
| 3,176,880 | 4/1965 | Archbold | 220/316 X |
| 4,325,491 | 4/1982 | Barnhill | 220/314 X |
| 4,347,833 | 9/1982 | Luebke et al. | 220/316 X |
| 4,721,094 | 1/1988 | Nett | 220/314 X |
| 4,930,408 | 6/1990 | King et al. | 99/407 X |

*Primary Examiner*—Steven M. Pollard
*Attorney, Agent, or Firm*—Frost & Jacobs

[57] ABSTRACT

A single handle-actuated lid opening, closing, and locking mechanism for a large capacity pressure cooker having an open-top cooking vat and a counter-balanced lid shiftable vertically between a vat open and a vat closed position. The mechanism comprises a pair of slotted hook arms mounted to either side of the vat. A cam bar extends transversely of the vat lid and is provided with a forwardly extending arm near each of its ends. The forward ends of the arms are joined by a bar constituting a handle in parallel spaced relationship to the cam bar. The ends of the cam bar support rollers receivable within the slots of the hook arms. The cam bar is manually shiftable by the handle between a forward lid locking position and a rearward unlocking and lid engaging position. In its forward lid-locking position, the cam bar assumes an over-center orientation with its rollers bearing upwardly against the upper surfaces of the hook arm slots and the cam bar body bearing downwardly against the lid. In its rearward unlocked and lid engaging position, the cam bar is rigidly coupled to the lid so that upward and downward forces applied to the handle result in vertical upward and downward movement of the lid between its vat open and its vat closed positions. A cam bar lock precludes unlocking and opening of the lid when the vat is pressurized.

22 Claims, 10 Drawing Sheets

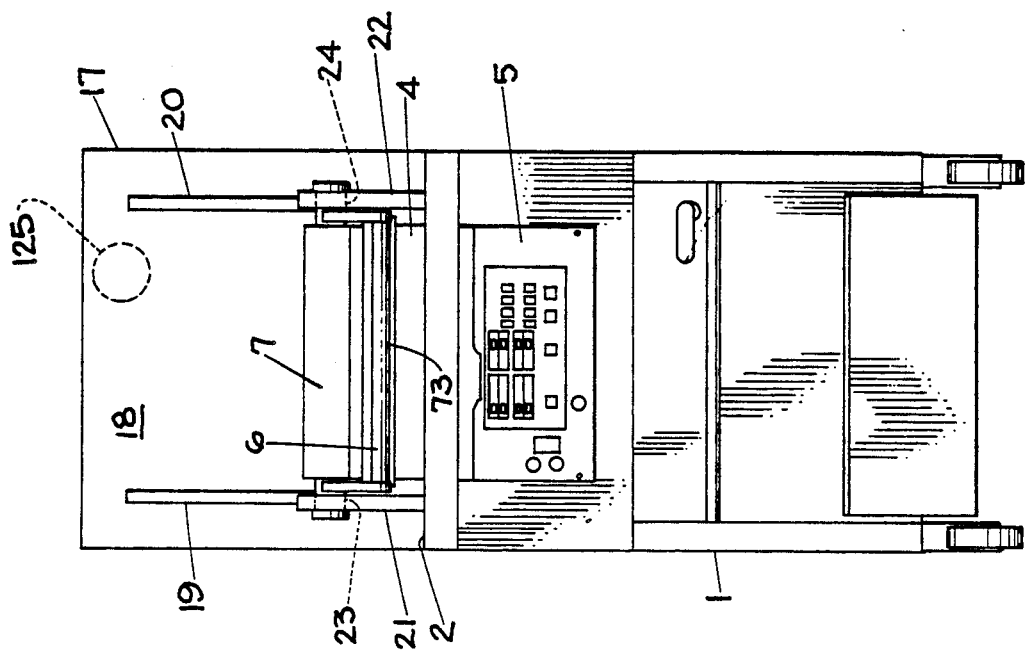
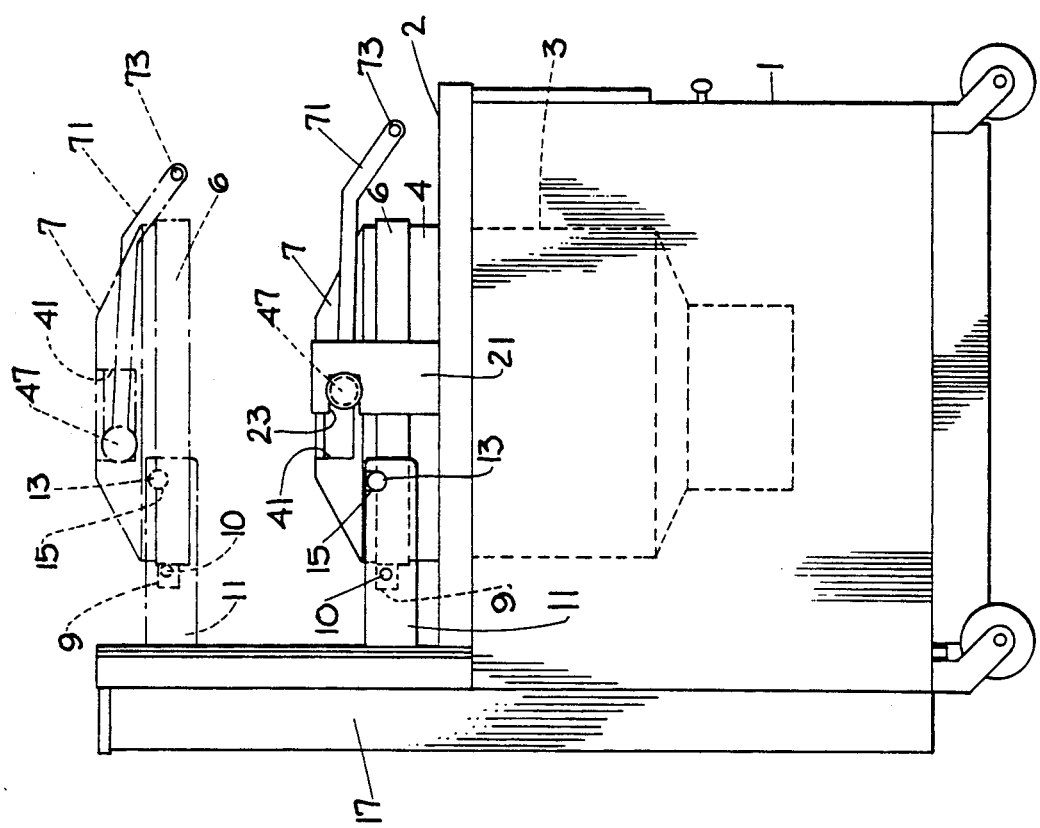

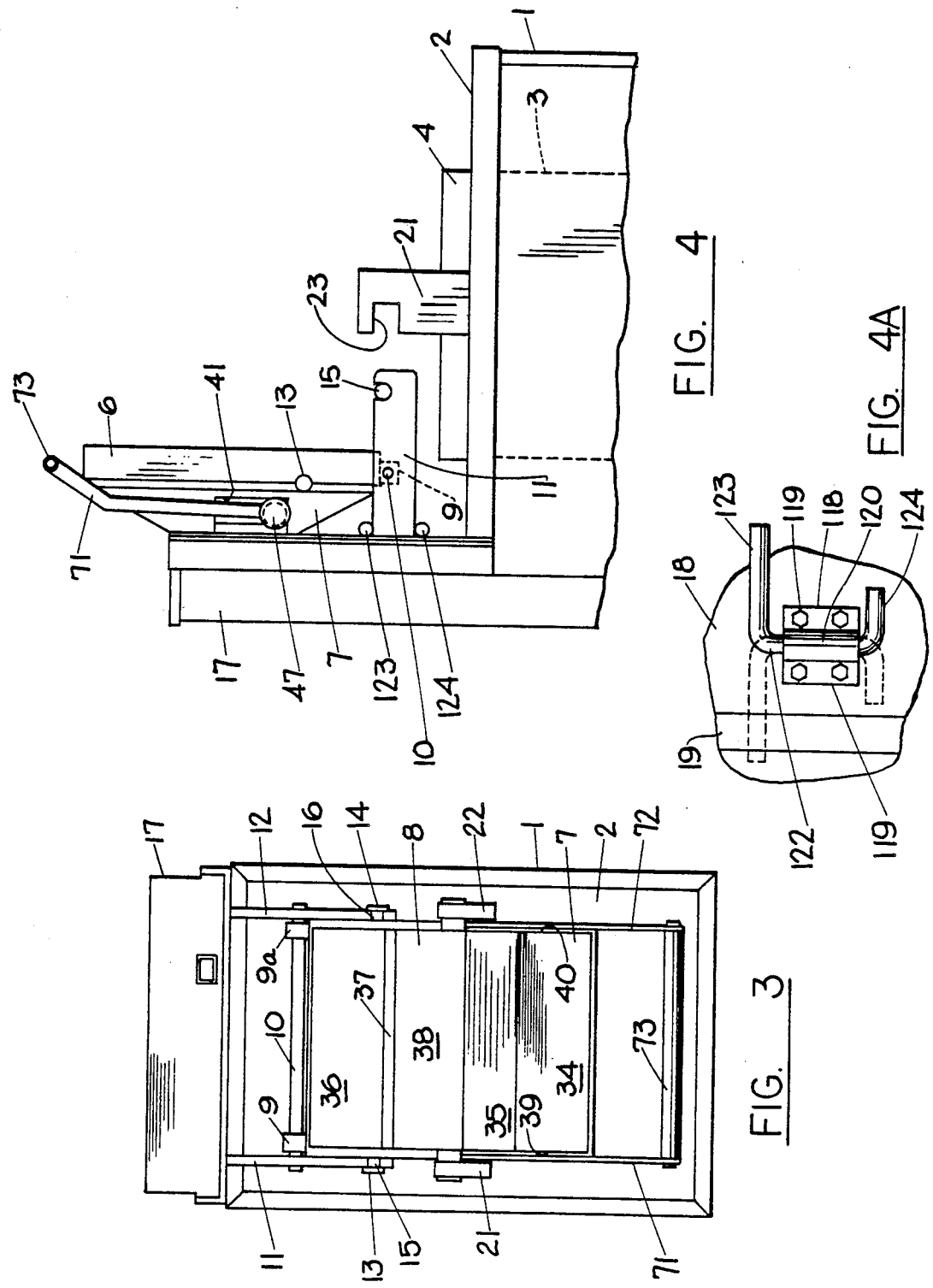

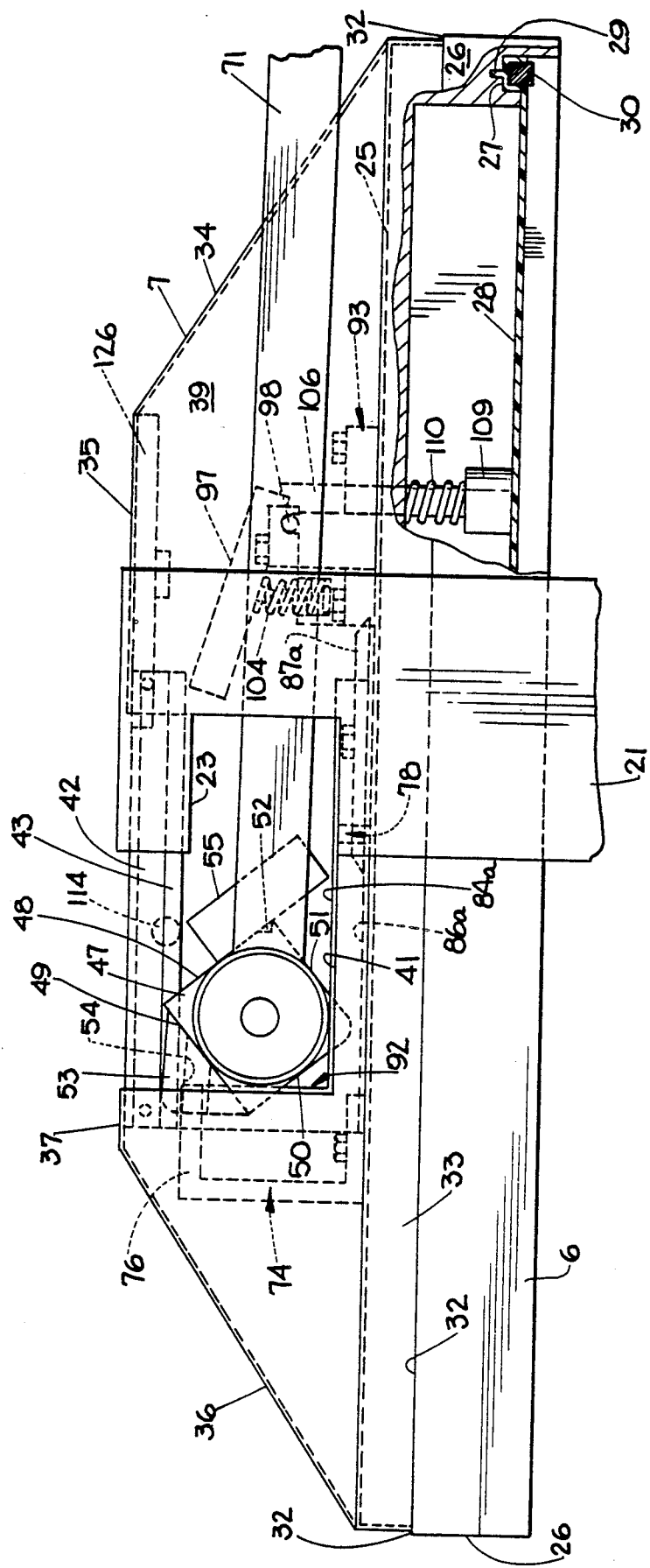
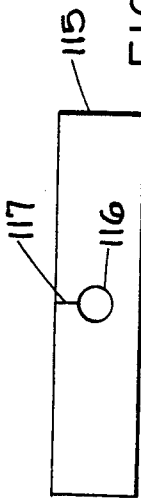
FIG. 13
FIG. 13A

SINGLE HANDLE LID OPENING, CLOSING AND LOCKING MECHANISM FOR A LARGE CAPACITY PRESSURE COOKER

REFERENCE TO RELATED APPLICATION

The present invention teaches improvements with respect to large capacity pressure cookers of the type set forth in co-pending application Ser. No. 07/283,571, filed Dec. 13, 1988, U.S. Pat. No. 4,930,408, in the names of James D. King and Stephen D. Werts, and entitled LARGE CAPACITY PRESSURE COOKER.

TECHNICAL FIELD

The invention relates to mechanism for opening, closing and locking the vat lid of a large capacity pressure cooker, and more particularly to such a mechanism which employs a single handle, is simple in construction and operation, and requires a minimum of manipulation by the operator.

BACKGROUND OF THE INVENTION

Pressure cookers generally comprise a vat or cooking vessel of a size to receive a wire basket in which the product to be cooked is placed and then immersed in the cooking oil contained in the vat. The vat is closed by a lid which is sealed to the top of the vat, whereupon the product is cooked for the desired length of time under both heat and pressure. Following the cooking cycle, the pressure in the vat is relieved and the lid is opened, whereupon the product is removed from the wire basket.

The type of large capacity pressure cooker to which the present invention is directed is illustrated and described in the above noted co-pending application, the teachings of which are incorporated herein by reference. During the cooking operation, when the vat is pressurized, it is imperative that the vat lid be firmly closed and locked, as a matter of safety.

It will be appreciated that the vat lid and its associated mechanism is large and heavy making it difficult to shift the lid vertically between its open and closed positions. Prior art workers have devised counter balancing mechanisms to alleviate this problem. Nevertheless, the prior art large capacity pressure cookers are characterized by very complex lid opening, closing and leveling means which require considerable operator manipulation of a series of elements. Many of the opening, closing and locking mechanisms are such that it is impractical for the cookers to be operated by personnel lacking the size and physical strength to cope with the rigors of manual operations required to operate the equipment. Some require manipulation of a first handle for raising and lowering the lid, and manipulation of a second handle for locking the lid in its closed position.

In contrast to the foregoing, the present invention provides a large capacity pressure cooker capable of handling, for example, 10 heads of chicken, while at the same time providing a lid opening, closing and locking mechanism which can be operated by the average worker without undue physical exertion and with a minimum of manipulation. The lid opening, closing and locking mechanism is operated by a single handle and is simpler in construction and operation than those of the prior art. In addition, positive means are provided to preclude mistaken unlocking and opening of the vat lid while the vat is pressurized.

SUMMARY OF THE INVENTION

According to the invention there is provided a single handle-actuated lid opening, closing and locking mechanism for a large capacity pressure cooker. The pressure cooker has open top cooking vat and a counter balanced lid liftable vertically between vat open and vat closed positions.

The mechanism comprises a pair of slotted hook arms mounted to either side of the vat and a cam bar which is mounted on and extends transversely of the vat lid. The cam bar is provided with forwardly extending arms near its ends. The forward ends of the arms are joined by a bar comprising a handle in parallel spaced relationship to the cam bar. The ends of the cam bar support rollers receivable within the slots of the hook arms. The main body portion of the cam bar is of non-circular cross section.

The cam bar is manually shiftable longitudinally of the lid by the handle, between a forward lid locking position and a rearward unlocking and lid engaging position. Guide means are provided to assure proper shifting of the cam bar. In its forward lid locking position, the cam bar assumes an over-center orientation with its rollers bearing upwardly against the upper surfaces of the hook arm slots, and the main body portion of the cam bar bearing downwardly against the lid. In its rearward unlocked and lid engaging position, the cam bar is rigidly coupled to the lid so that upward and downward forces applied to the handle result in vertical upward and downward movement of the lid between its vat open and its vat closed positions. A cam bar lock is provided which precludes unlocking and opening of the lid while the vat is pressurized.

DESCRIPTION OF THE DRAWINGS

FIG. 1 is a front elevational view of an exemplary large capacity pressure cooker provided with the lid opening, closing and locking mechanism of the present invention.

FIG. 2 is a side elevational view of the cooker of FIG. 1 as seen from the left side of that figure.

FIG. 3 is a plan view of the cooker of FIGS. 1 and 2.

FIG. 4 is a fragmentary side elevational view of the cooker of FIGS. 1-3 illustrating the vat lid in its upwardly hinged position for cleaning.

FIG. 4A is a fragmentary elevational view of the support arm latch.

FIGS. 8-13 are fragmentary left side elevational views of one of the hook arms, the lid, the lid cover and the opening, closing and locking mechanism of the present invention, illustrating in sequence the movement of the cam bar from its forward, over-center lid locking position to its rearward unlocked and lid engaging position.

FIG. 13A is an elevational view of a window closure sheet.

DESCRIPTION OF THE PREFERRED EMBODIMENT

Figure 5:
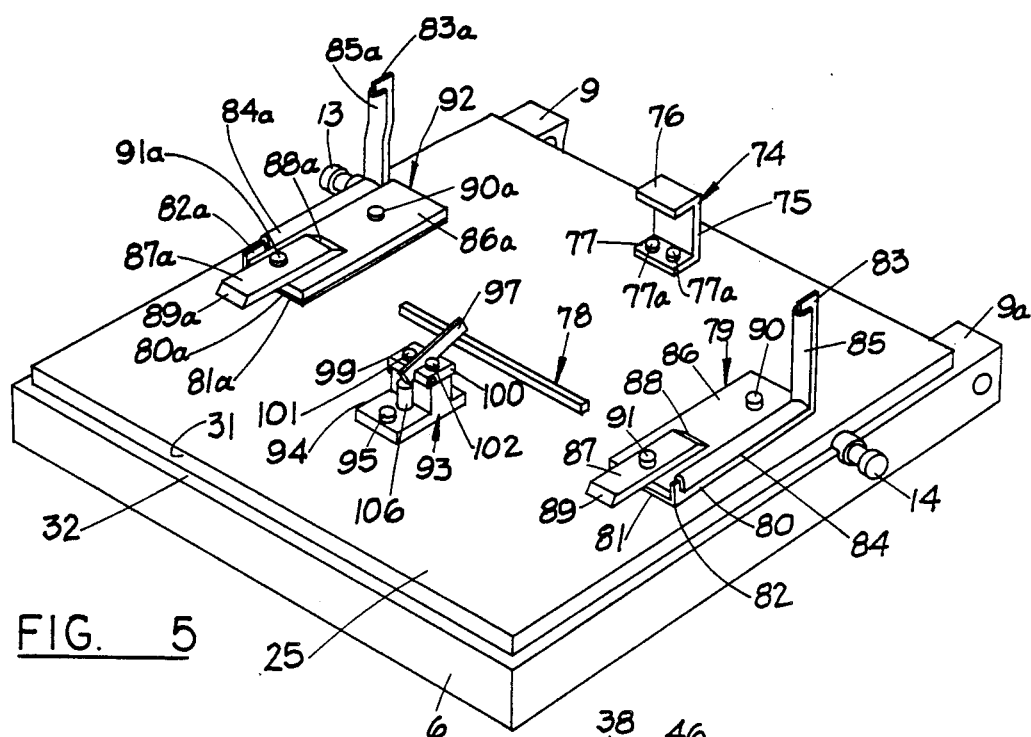
FIG. 5 is a perspective view of the vat lid with its stainless steel cover and the cam bar together with its associated arms and handle removed for purposes of clarity.

Referring first to FIGS. 1-4, the cooker illustrated is essentially the same as the cooker taught and illustrated in the above-noted co-pending application. To this end, the cooker comprises a generally rectangular housing 1 having an essentially table-top height upper surface 2. The housing 1 encloses a rectangular cooking vat shown in dotted lines at 3 in FIG. 2, the open top 4 of which projects upwardly above the upper surface 2 of housing 1 (See also FIG. 5). A control module 5 is mounted on the front wall of housing 1 (See FIG. 1) for controlling the various functions of the cooker.

The open top 4 of the vat 3 is adapted to be closed by a lid 6, preferably formed of cast aluminum. The upper portion of the lid 6 is provided with a stainless steel cover 7 affixed thereto by machine screws and having a removable upper panel 38 (See FIG. 3), as will be more fully described hereinafter. The lid 6 has a pair of integral cast perforated lugs 9 and 9a journaled on a shaft 10. Opposite ends of the shaft 10 are received in mounting arms 11 and 12. The integral, rearwardly extending lid lugs 9 and 9a, together with shaft 10, form a hinge by means of which the lid 6 may be pivoted from a horizontal position to a vertical position for cleaning purposes. This is shown in FIG. 4 and will be described in greater detail hereinafter. The lid 6 is normally maintained in a horizontal position (as shown in FIG. 2) by means of studs 13 and 14 (See also FIG. 5). The studs 13 and 14 normally lie in upwardly opening slots 15 and 16 in the mounting arms 11 and 12, respectively.

The lid 6 is shiftable vertically between a closed position in solid lines in FIG. 2 and an open position shown in broken lines in the same figure. The housing 1, at its rearward end, is provided with a vertical cabinet 17 having a forward surface 18. The raising and lowering of lid 6 is implemented by a counterbalancing mechanism located within the cabinet 17 and fully described in the above-mentioned co-pending application. Briefly, the mounting arms 11 and 12 extend rearwardly through slots 19 and 20 in the front surface 18 of cabinet 17 and are affixed to a frame (not shown) shiftably mounted within cabinet 17 in a pair of vertical guide rails (not shown). The frame is connected, through a cable and pulley system, to a vertically shiftable counterweight (not shown), chosen so as to effectively counterbalance the weight of lid 6.

The underside of lid 6 is provided with hangers (not shown) adapted to detachably receive a carrier (not shown) for the support of wire product-carrying trays. As is described in the above-noted co-pending application, each tray is filled with product to be cooked and then is inserted in the carrier from the front of the cooker. When the lid 6 is shifted from its open to its closed position, the product-filled trays are lowered into vat 3. The carrier for the trays may be readily removed from the lid for cleaning purposes, or when it is desired to clean the lid, itself.

It will be understood by one skilled in the art that the cooker will have a number of additional elements such as heating coils for the vat 3, a collection tank for spent cooking oils, various valve means and the like, together with various safety devices. These elements are known in the art and are not further discussed herein since they do not constitute a part of the present invention.

As indicated above, the invention is directed to an improved lid opening, closing and locking mechanism which will now be described The lid opening, closing and locking mechanism is association with the lid 6, itself, with the exception of a pair of hook arms 21 and 22. The hook arms 21 and 22 comprise upstanding members affixed to housing 1 on either side of the open top 4 of vat 3. Hook arm 21 is most clearly shown in FIG. 4. The hook arm 21 is provided with a horizontal slot 23 opening rearwardly of the hook arm Hook arm 22 is substantially identical to hook arm 21 and is provided with a slot 24 (See FIG. 1). The purpose of hook arms 21 and 22 will be apparent hereinafter.

Figure 8:
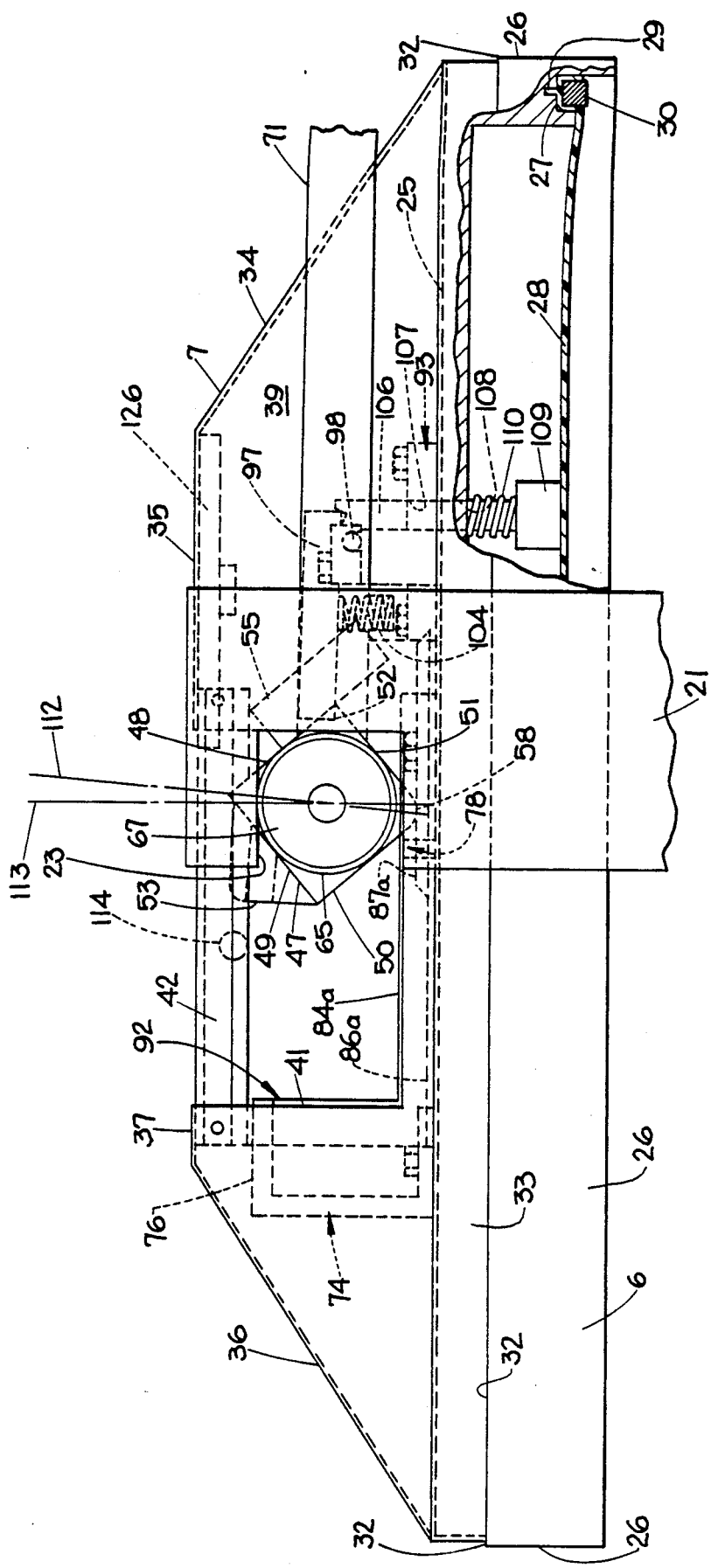

Reference is made to FIGS. 5 and 8. The cast aluminum lid 6 has a planar top 25 and a surrounding, downwardly depending, peripheral sidewall 26. The inside surface of planar lid top 25 and the inside surfaces of peripheral side wall 26 may be provided with integral reinforcing ribs and the like (not shown). The peripheral sidewall 26 has a groove 27 formed therein which extends about the lid 6. The lid is provided with a planar stainless steel liner 28, the edges of which are configured to be received within the groove 27 and maintained therein by plurality of machine screws, one of which is shown in FIG. 8 at 29. The groove 27 also receives a resilient gasket 30 adapted to make a seal with the upper edge of the open upper end 4 of vat 3.

As is most clearly shown in FIG. 5, the sidewall 6 is inwardly stepped as at 31, forming a peripheral shoulder 32. The shoulder 32 supports the bottom peripheral vertical flange 33 of a stainless steel cover 7. The flange 33 is affixed to the lid 6 by a plurality of machine screws (not shown) which extend into the stepped portion 31 of the lid.

From the flange 33, the front of the cover 7 comprised a first planar panel 34 sloping upwardly and rearwardly and terminating in a second planar panel 35 wich is substantially horizontal. At the rear of cover 7, a panel 36 extends upwardly and forwardly and terminates in a narrow, substantially horizontal panel 37. The gap between the ends of horizontal cover panel portions 35 and 37 is filled by a removable panel 38 (See FIGS. 3 and 7) having downwardly depending end flanges. The removable panel 38 is not shown in FIGS. 8-13.

With the exception of removable panel 38, the stainless steel cover 7 is a unitary, one-piece structure completed by sidewalls 39 and 40. Sidewall 39 is shown in FIG. 8. The sidewall 39 is inset slightly from the adjacent flange portion 33 of the cover 7. The sidewall 39 is planar and trapezoidal in peripheral shape. The sidewall has a large rectangular notch or "window" 41 formed therein having a length dimension equivalent to the width of removable panel 38. The purpose of window 41 will be apparent hereinafter. The upper end of window 41 is closed by a bar-like spacer 42, an angle iron 43, and the adjacent end flange of the removable panel 38, when mounted in position.

Figure 7:
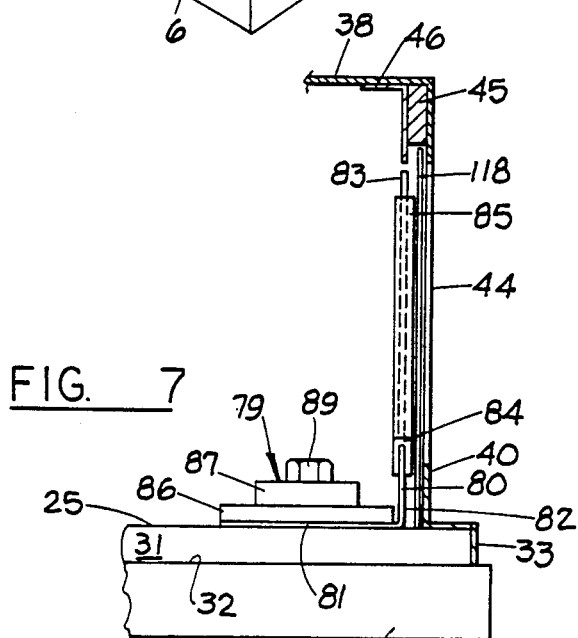
FIG. 7 is a fragmentary cross-sectional view of the vat lid and its stainless steel cover.

The cover side 40 is a mirror image of cover side 39 and is shown in cross-section in FIG. 7. The side 40 has a large rectangular window 44, identical to window 41. The cross-sectional view of FIG. 7 is taken through the window 44. Again, the upper end of window 44 is closed by a bar-like spacer 45 and an angle iron 46, identical to spacer 42 and angle iron 43, together with the adjacent end flange of panel 38.

Figure 6:
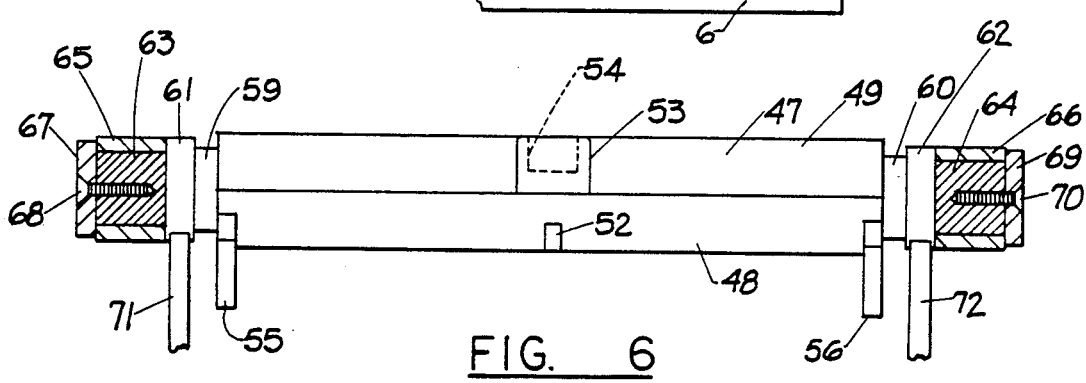
FIG. 6 is a fragmentary plan view of the cam bar of the present invention.

The primary moving element of the lid opening, closing and locking mechanism of the present invention is an elongated cam bar illustrated at 47 in FIG. 6. For the majority of its length, the cam bar 47 is of square cross-section (as perhaps can most clearly be seen from FIG. 11). As a result of the square cross-section, the cam bar 47 has four faces 48, 49, 50 and 51. The face 48 is provided with a notch 52. The face 49 is provided with a lug 53 containing a slot 54. The face 48 has two substantially identical, upstanding, rectangular lugs 55 and 56 welded or otherwise appropriately affixed thereto. The lugs 55 and 56 are mounted at the ends of face 48.

Figure 11:
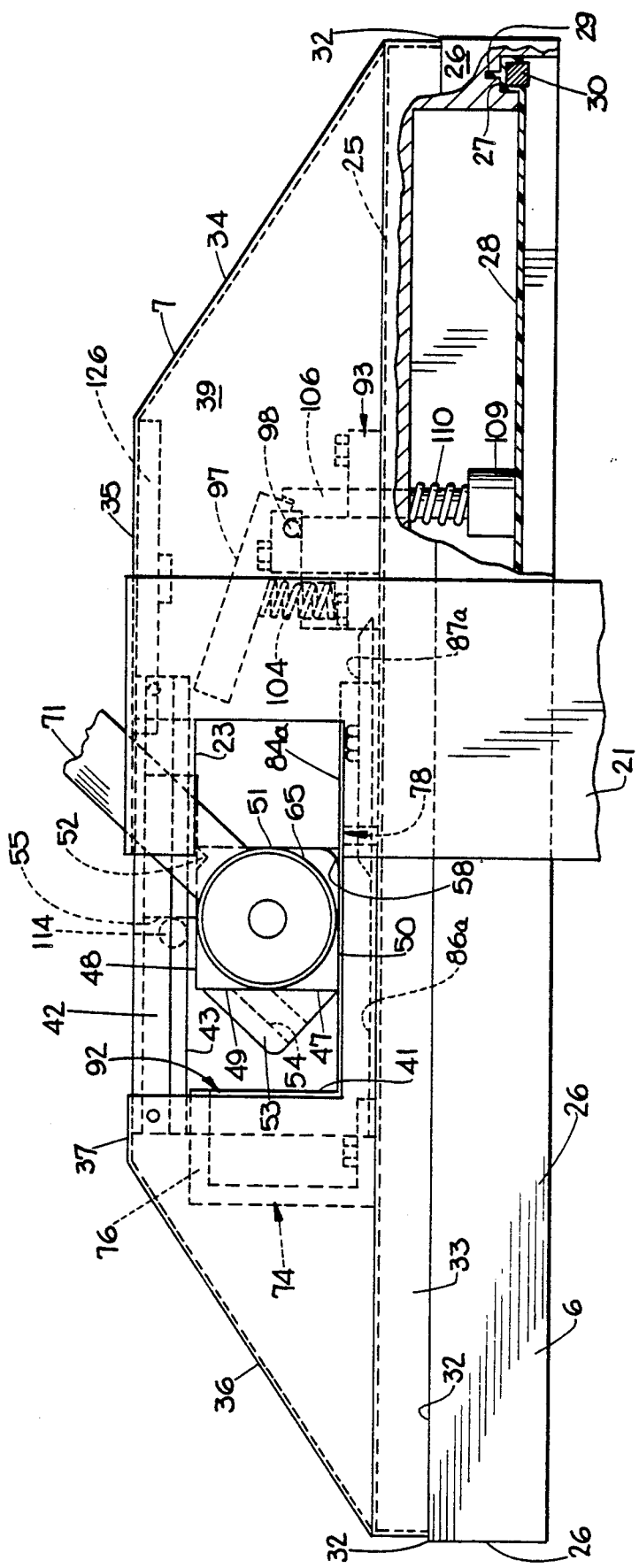

The left-hand end of cam bar 47 (as viewed in FIG. 6) is the end illustrated in FIG. 11. It will be noted from FIG. 11 that the juncture of the cam bar faces 50 and 51 near the left end of that portion of the cam bar having a rectangular cross-section, is rounded as at 58. The juncture of faces 50 and 51 near the other end of the rectangular portion of cam bar 47 is similarly rounded (not shown). The purposes of notch 52, lug 53, lugs 55 and 56 and the rounded portions of the cam bar will be apparent hereinafter.

The main body portion of cam bar 47 having a square cross-section terminates at both ends in identical cylindrical surfaces 59 and 60 (See FIG. 6). Cylindrical portions 59 and 60, in turn, terminate in cylindrical portions 61 and 62 of somewhat larger diameter. The endmost portions 63 and 64 of the cam bar are again of cylindrical configuration having a diameter approaching that of portions 59 and 60 and less than that of portions 61 and 62. The endmost portions 63 and 64 support cylindrical rollers 65 and 66, respectively the cylindrical rollers 65 and 66 are freely rotatable on the cam bar ends 63 and 64. The rollers 65 and 66 are preferably made of wear resistant plastic material such as nylon. Excellent results have been achieved with rollers 65 and 66 made of a nylon material designated by the mark Nylatron GS, manufactured by Polymer Corporation, of Reading, Pa. The roller 65 is captively mounted on the cam bar end 63 between cam bar portion 61 and a circular plate 67 affixed to the cam bar end portion 63 by machine screw 68. In similar fashion, the roller 66 is captively mounted on the end portion 64 of cam bar 47 between cam bar portion 62 and a circular plate 69 mounted with a machine screw 70.

The cam bar 47 is completed by a pair of arms 71 and 72 welded or otherwise appropriately affixed to the cam bar portions 61 and 62, as shown in FIG. 6. The elongated arms 71 and 72 are identical and, as is illustrated in FIG. 3, their forward free ends are joined together by a bar-like member 73 constituting a handle for manipulation of cam bar 47. The cam bar 47, its arms 71 and 72 and the handle 73 are preferably made of stainless steel.

Reference is now made to FIG. 5. It will be remembered that FIG. 5 illustrates the lid 6 with its stainless steel cover 7 removed to expose various elements affixed to the planar upper surface 25 of lid 6. The individual elements next to be described cooperate in one manner or another with the cam bar 47. The first is a cam bar engagement means generally indicated at 74. The cam bar engagement means 74 is also illustrated in FIGS. 8-13. The cam bar engagement means 74 comprises a section of metallic C-channel having a central web 75 and upper and lower flanges 76 and 77. The cam bar engagement means 74 is centrally located near the rearward portion of lid 6, with its flanges at 76 and 77 extending toward the forward end of the lid. The element 74 is affixed to the lid 6 by bolt means 77a extending through the lower flange 77 and threadedly engaged in the top of lid 6.

The next element comprises an alignment bar generally indicated at 78. The alignment bar comprises an elongated bar-like structure of rectangular cross-section affixed to the upper surface 25 of lid 6 by machine screws or other appropriate fastening means (not shown). The alignment bar 78 is located substantially centrally of top surface 25 of lid 6 and extends transversely thereof. Alignment bar 78 is also shown in broken lines in FIGS. 8-13.

A right cam bar guide assembly is illustrated in FIGS. 5 and 7 and is generally indicated at 79. The right cam bar guide assembly comprises an elongated angle plate 80 having a planar horizontal plate-like leg 81 and a relatively short, upstanding planar leg 82. Near the end of angle plate 80, the upstanding leg 82 is elongated vertically, as at 83. It will be noted from FIGS. 5 and 7 that the upper edge of the short vertical leg portion 82 and the forward edge of the long vertical leg portion 83 are covered by protective strips of U-shaped cross-section, indicated at 84 and 85, respectively. Any appropriate wear-resistant plastic material may be used for this purpose. Excellent results have been achieved, for example, when the elements 84 and 85 were made of the above-noted Nylatron GS.

The horizontal leg 81 of angle plate 80 is surmounted by a rectangular metallic spacer member. The spacer member 86, in turn, is surmounted by a block of appropriate wear-resistant plastic material such as the above-noted Nylatron GS. It will be noted that the block 87 extends over slightly less than half the length of spacer member 86 and overhangs the spacer member at its forward edge. The rearward end 88 of block 87 slopes downwardly and rearwardly. The forward end 89 of block 87 is similarly slanted. As will be apparent hereinafter, forward end 89 of block 87 is not subject to wear of any sort. However, the rearward end 88 is subject to wear. Therefore, if the rearward end 88 becomes worn, the block 87 can be turned 180° so that the end 88 is replaced by the end 89.

The angle plate 80 and the spacer member 86 are attached to the top surface 25 of lid 6 by a bolt 90. In similar fashion, the block 87, spacer 86 and angle plate 80 are further attached the top surface 25 of lid 6 by bolt 91.

A left cam bar guide assembly is generally indicated at 92. The left cam bar guide assembly 92 is a mirror image of the right cam bar guide assembly 79 and is otherwise identical. As a consequence, like parts of the left cam bar guide assembly 92 have been given like index numerals followed by "a". The left cam bar guide assembly 92 is illustrated in each of FIGS. 8-13.

The final element affixed to the upper surface 25 of lid 6 comprises a cam bar latch generally indicated at 93. The cam bar latch 93 is also clearly shown in FIG. 10. This structure comprises a plate-like member 94 affixed to the upper surface 25 of lid 6 by bolts, some of which are shown at 95 in FIGS. 5 and 10. The plate-like member 94 has an upstanding body portion 96. A locking lever 97 is affixed a pivot pin 98. The pivot pin is rotatively mounted on the upper end of the upstanding body portion 96 by a pair of blocks 99 and 100 affixed thereto by bolts 101 and 102. The locking lever 97 is freely swingable between an upwardly and rearwardly extending unlocked position (illustrated in FIGS. 5 and 10) and a horizontal locked position illustrated in FIG. 8. The rearward end of the upstanding body portion 97 has a cylindrical socket 103 formed therein, wherein one end of a compression spring 104 bottoms The other end of compression spring 104 abuts the bottom edge of locking lever 97 and surrounds a centering pin 105 affixed thereto. By virtue of spring 104, locking lever 97 is biased to its unlocked position The cam bar lock 93 is completed by a plunger 106 which extends through a perforation 107 in plate-like member 94 and a perforation 108 in the top of lid 6. The bottom end of plunger 106 is provided with an abutment block 109 which rests against the inner stainless steel liner 28 of lid 6. The plunger 106 is surrounded by a compression spring 110. One end of compression spring 110 engages abutment block 109. The other end of compression spring 110 abuts the inner surface of the top of lid 6. Therefore, plunger 106 is biased to its lowermost position shown in FIGS. 5 and 10 wherein the locking lever is in its unlocked position. The upper end of plunger 106 is notched as at 111 to engage the lower forward corner of locking lever 97.

Figure 10:
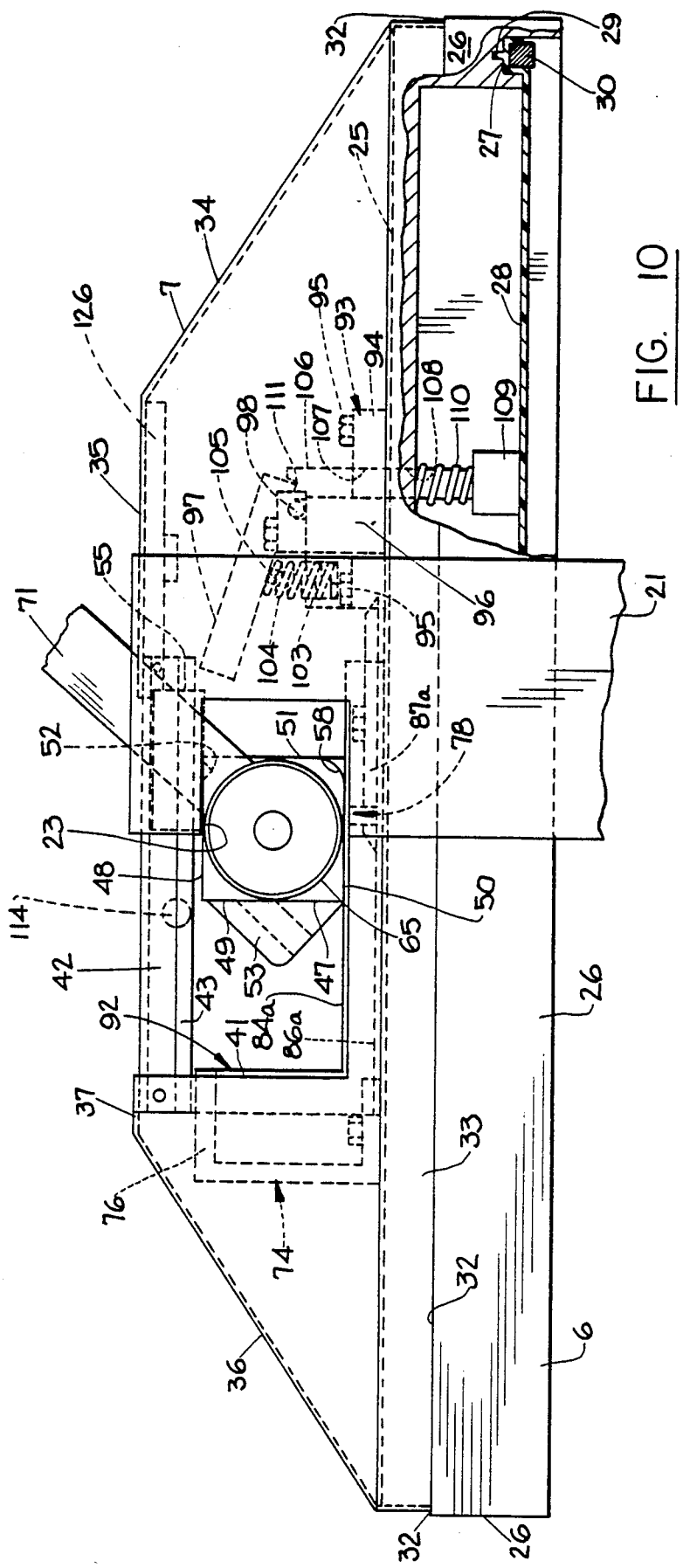

Under normal circumstances, the lid liner 28 constitutes a planar stainless steel member. The plunger 106 is normally in its lowermost position as shown in FIGS. 5 and 10 and the locking lever 97 is normally in its unlocked position as shown. However, when the lid 6 is in its closed and latched position, and the vat 3 is pressurized during a cooking cycle, the lid liner 28 will be bowed slightly upwardly by the pressure within vat 3 This, in turn, will cause plunger 106 to shift upwardly against the action of compression spring 110. The uppermost end of plunger 106 will engage and shift upwardly the forward lower corner of locking lever 97, pivoting locking lever 97 to its locked condition against the action of compression spring 104 as shown in FIG. 8. Pressure within vat 3 will maintain the locking lever in its locked position Since the upper end of plunger 106 is located so close to pivot pin 98, the plunger 106 need be shifted vertically upwardly only a very short distance to cause the locking lever 97 to shift from its unlocked to its locked position.

The basic elements of the lid opening, closing and locking mechanism having been described, the manner in which they operate will now be set forth. In FIG. 8, the cover 7 is shown mounted on lid 6. When the mechanism is fully assembled, the cam bar 47 extends transversely of lid 6. The ends of the cam bar including the arms 71 and 72 and the rollers 65 and 66 extend outside the stainless steel cover by way of windows 41 and 44.

The cam bar 47 is shiftable manually (by means of handle 73) longitudinally of the lid 6 between a forward lid locking position and a rearward unlocking and lid engaging position As it is shifted between these positions, the cam bar 47 is guided by engagement of its cylindrical portions 59 and 60 (see FIG. 6) with the protective elements 84a and 84, respectively, of the left and right cam bar guide assemblies 92 and 79.

FIG. 8 illustrates the cam bar 47 in its forward lid locking position This forward position of cam bar 47 is determined by the fact that its roller 65 is fullY seated within the notch 23 of hook arm 21. It will be understood that the cam bar roller 66 will similarly be fully seated in the notch of hook arm 22. The cam bar handle 73 is in its forwardmost and lowermost position, as shown in FIG. 2. This positioning of handle 73 causes the cam bar 47 to assume the rotative position illustrated in FIG. 8. In this rotative position, the roller 65 bears upwardly against the upper surface of hook arm notch 23, and the rounded portion 58 of the juncture of cam bar faces 50 and 51, adjacent roller 65, bears downwardly against block 87a. In similar fashion it will be understood that the roller 66 will be bear against the upper surface of the notch 24 of hook arm 22 and the rounded juncture of cam bar surfaces 50 and 51, adjacent roller 66, will bear against block 87. Under these circumstances, the lid 6 is fully closed against the open upper end 4 of vat 3 (see FIG. 2).

When the cam bar 47 is in its forward lid locking position, its cylindrical portions 59 and 60 are lifted slightly above the elements 84a and 84 of the cam bar guide assemblies 92 and 79, respectively. This is the result of compression of the resilient gasket 30 by the open upper end 4 of vat 3.

When the cam bar is in its forward lid locking position as illustrated in FIG. 8, it will be noted that a line 112 drawn through the juncture of cam bar surfaces 48 and 49 and the juncture of cam bar surfaces 50 and 51 lies approximately 10° beyond a vertical line 113 drawn through the axis of cam bar 47. Thus the cam bar 47 has assumed an over-center position locking lid 6 in its closed position with respect to the open upper end 4 of vat 3.

During the cooking cycle, when the lid 6 is closed and locked with respect to the open upper end 4 of vat 3, the vat is thereafter pressurized. To prevent injury to the operator, it is important that the lid 6 cannot mistakenly be opened while the vat 3 is pressurized. This is the function of cam bar lock 93 which automatically locks the cam bar 47 in the position shown in FIG. 8 while the vat 3 is pressurized. The manner in which this is accomplished is illustrated in FIG. 8.

While the vat 3 is not illustrated in FIG. 8, it is to be assumed that the lid 6 is indeed in its closed and locked position with respect to the vat. It is further t be assumed that the vat is pressurized as is indicated by the slight upward bowing of the normally planar lid liner 28. This slight upward bowing of lid liner 28 causes the cam bar lock plunger 106 to shift upwardly against the action of compression spring 110. The upper end of plunger 106, in engagement with forward end of locking lever 97, causes the locking lever 97 to rotate in a counter clockwise direction about pivot pin 98 and against the action of compression spring 104. This, in turn, causes the rearward end of locking lever 97 to engage in the notch 52 in the surface 48 of cam bar 47, precluding rotation of the cam bar 47 in a counter clockwise direction toward an unlocked position. As a consequence, the cam bar 47 cannot be shifted by its handle 73 to its rearward unlocking and lid engaging position until the cam bar, itself, is released by locking lever 97 of the cam bar lock 93.

Figure 9:
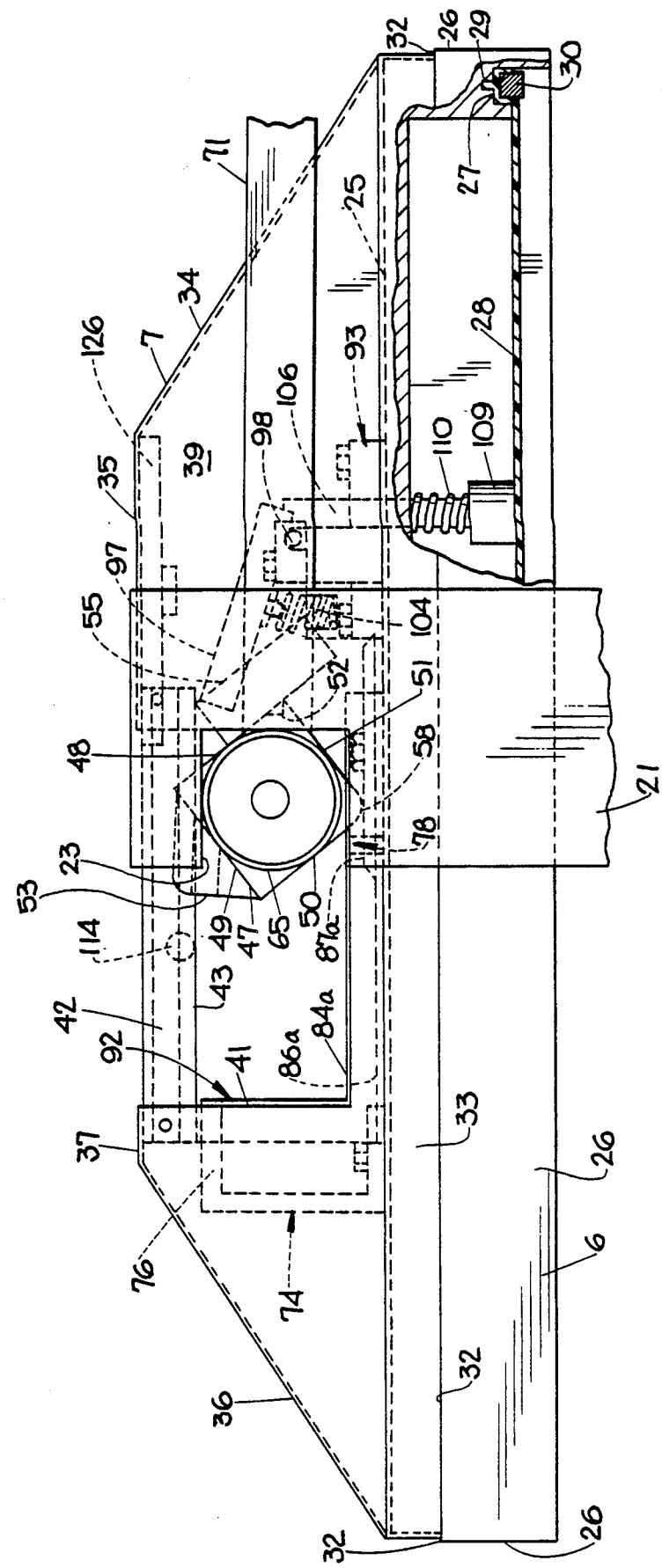

FIG. 9 is similar to FIG. 8. FIG. 9 illustrates the cam bar in its forward lid-locking position. FIG. 9 also illustrates release of the cam bar by the cam bar lock 93 due to depressurization of vat 3.

When the vat 3 is depressurized, the lid liner 28 will return to its normal, planar, horizontal condition as shown in FIG. 9. This will enable the plunger 106 of the cam bar lock 93 to shift downwardly with the liner 28, under the influence of compression spring 110. As the cam bar lock plunger 106 shifts downwardly, the locking lever 97 will move with it, rotating in a clockwise direction about pivot pin 98 under the influence of compression spring 104. As a result, the cam bar lock is in its unlocked condition and cam bar 47 can now be shifted by the operator from its forward lid locking position to its rearward unlocking and lid engaging position. The steps involved in this shift are illustrated in FIGS. 10-13.

Reference is first made to FIG. 10. As a first step in shifting the cam bar 47 from its forward lid locking position to its rearward unlocking and lid engaging position, the operator lifts the handle 73 to its uppermost position. This causes rearward shifting and counter clockwise rotation of the cam bar to the position shown in FIG. 10. This position of the cam bar and the uppermost position of the handle 73 are determined by abutment of cam bar lug 55 against the horizontal leg of angle iron 43. It will be understood that the cam bar lug 56 will similarly abut against the horizontal leg of angle iron 46 (see FIG. 7). At this point, the force compressing the lid gasket 30 is released and the cylindrical portions 59 and 60 of the cam bar will engage the elements 84a and 84 respectively of the left and right cam bar guide assemblies 92 and 79.

Having raised the handle 73 to its uppermost position, the next step performed by the operator is to shift the raised handle rearwardly This is illustrated in FIG. 11. The assembly of spacer 42 and angle iron 43 supports an inwardly extending stud 114. The cam bar 47 shifts rearwardly until its lug 55 contacts the stud 114. It will be understood that the assembly of the spacer 45 and angle iron 46 (see FIG. 7) also support a stud (not shown) equivalent to stud 114. This last mentioned stud is contacted by the cam bar lug 56. The studs are located directly across from each other so that when contacted, the cam bar 47 remains in its transverse orientation with respect to the lid 6. When cam bar 47 reaches the position illustrated in FIG. 11, further rearward movement of the cam bar is precluded by the studs and this serves as a tactile signal to the operator to return the handle 73 to its lowermost position.

Figure 12:
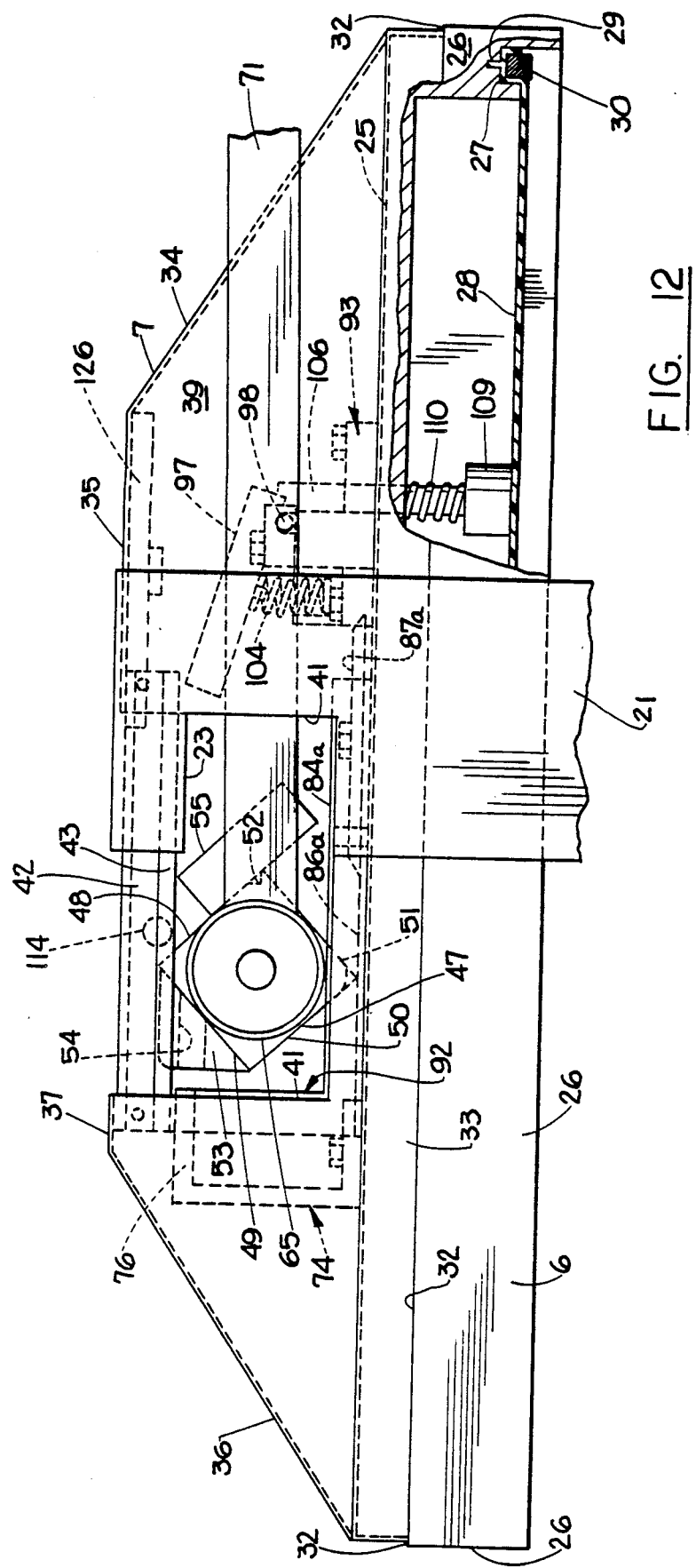

FIG. 12 illustrates the orientation of the cam bar 47 when the operator lowers the handle 73 to its lowermost position. It will be apparent from FIG. 12 that the lowering of the handle 73 accomplishes two things. First of all, it rotates the cam bar's lugs 55 and 56 to a position clear of the studs. Secondly, it rotates the cam bar lug 53 to a position wherein its slot 54 is in alignment with the upper flange 76 of cam bar engagement means 74. With the cam bar 47 in the orientation illustrated in FIG. 12, the operator can now shove the assembly rearwardly to cause the cam bar to achieve its final rearward unlocking and lid engaging position.

The rearward unlocking and lid engaging position of the cam bar is illustrated in FIG. 13. The maximum rearwardmost position of the cam bar is determined by abutment of the cam bar cylindrical portions 59 and 60 with the upstanding elements 85a and 85 respectively of the cam bar guide assemblies 92 and 79. When the upper flange 76 of the cam bar engagement means 74 enters the slot 54 of cam bar lug 53, the handle 73 of the assembly is locked in its lowermost position and the cam bar is mechanically coupled with lid 6 through the cam bar engagement means 74. As a consequence, if the operator lifts upwardly on handle 73, the entire lid 6 will raise upwardly to its open position shown in broken lines in FIG. 2. A downward force on handle 73 will cause the lid 6 to return to its closed position shown in solid lines in FIG. 2. It will be remembered that vertical shifting of the lid 6 is augmented by the counterbalancing mechanism described briefly above.

To return the cam bar 47 from its rearward unlocking and lid engaging position to its forward lid locking position is accomplished by substantially repeating the above described steps in reverse. Returning to FIG. 13, when it is desired to shift the cam bar to its forward lid locking position, the operator need simply pull the handle forwardly. As is apparent from FIG. 13, this will disengage the upper flange of cam bar engagement means 74 from the slot 54 of cam bar lug 53. Therefore, cam bar and its handle 73 are no longer mechanically coupled to the lid. The cam bar will shift forwardly until its face 48 engages stud 114 and its counterpart on the other side of the lid cover 7. This will serve as a tactile indication to the operator to lift the handle 73 to its uppermost position as shown in FIG. 11. The cam bar is then properly oriented to be shifted further forward to the position illustrated in FIG. 10 and finally to the position illustrated in FIG. 9. As the cam bar is rotated by upward movement of handle 73 and simultaneously shifted forwardly, it will momentarily contact alignment bar 78 which will assure proper transverse alignment of the cam bar 47 with respect to lid 6. When the cam bar reaches the position illustrated in FIG. 9, its rollers 65 and 66 are fully seated in the notches of hook arms 21 and 22, and further forward shifting of the cam bar is precluded. The operator need only lower the handle 73 to its lowermost position and the cam bar will assume its over-center lid-locking position illustrated in FIG. 8.

From the above, it will be apparent that the lid opening, closing and locking mechanism of the present invention is extremely simple in construction and operation. Opening, closing and locking is accomplished by the operator through the use of a single handle and a minimum of manipulative steps. To shift the cam bar from its forward lid-locking position to its rearward unlocking and lid engaging position, the operator need only lift the handle 73, shove it rearwardly until further rearward movement is precluded by the stud 114 and its counterpart on the other side of the lid cover 7. At this point, the operator simply lowers the handle and shoves it rearwardly as far as it will go, which will assure him that he has achieved the rearward unlocking and lid engaging position. To shift from the rearward unlocking and lid engaging position to the forward lid locking position, the operator need only pull the handle forwardly until further forward movement is precluded by the stud 114 and its counterpart. At this point, the operator raises the handle to its uppermost position and pulls forwardly until further forward movement is precluded by the cam bar rollers 65 and 66 fully seating in the slots of hook arms 21 and 22. At this point, the handle is pushed downwardly to its lowermost position and the operator can be assured that the lid 6 has achieved its fully closed and over-center locked position with respect to the open upper end 4 of vat 3.

To maintain the chamber formed by the upper surface 25 of lid 6 and the stainless steel cover 7, clean and free of grease, contamination and the like, it is preferable that means be provided to maintain the windows 41 and 44 essentially closed regardless of the position of cam bar 47. To this end, an elongated rectangular sheet of flexible plastic material (such as the above mentioned Nylatron GS) is provided for window 41. Such a flexible sheet is illustrated in FIG. 13A at 115. The central portion of the sheet is provided with a circular perforation having a diameter just slightly larger than the diameter of cylindrical portion 59 of cam bar 47. Such a perforation is shown at 116. The perforation 116 is connected either to the upper edge (as shown) or to the lower edge of sheet 15 by a cut 117. Through the agency of cut 117, the sheet 115 can be mounted on the cylindrical portion 59 of cam bar 47. The lower edge of the sheet 115, as viewed in FIG. 13A, is located between the upstanding leg 82A of the left cam bar guide assembly 92 and the sidewall 39 of the stainless steel cover 7. The upper edge of the sheet 115, as viewed in FIG. 13A, is located between the adjacent downwardly depending flange of removable panel 38 and the vertical leg of angle iron 43. In this way, that portion of sheet 115 adjacent the cam bar, itself, is guided and maintained substantially planar. Sheet 115 is made of such length that the window 41 will be closed thereby when the cam bar is in either its forward lid locking position or its rearward unlocking and lid engaging position. When the cam bar is in its rearward unlocking and lid engaging position, the left hand end of sheet 115 as viewed in FIG. 13A is simply caused to bend inwardly by the sloping panel 36 of stainless steel cover 7. Similarly, when the cam bar 47 is in its forward lid locking position, the right end of sheet 115, as viewed in FIG. 13A, is caused to bend inwardly by the sloping panel 34 of stainless steel cover 7.

The window 44 on the opposite side of stainless steel cover 7 is similarly provided with a substantially identical closure sheet 118. This closure sheet is illustrated in FIG. 7 and it will be noted that the bottom edge of closure sheet 118 is located between the upstanding leg 82 of the right cam bar guide assembly 79 and the side 40 of cover 7. Similarly, the upper edge of closure sheet 118 is located between the vertical leg of angle iron 46 and the adjacent downwardly depending flange of removable panel 38.

As briefly described above with respect to FIG. 4, the lid 6 is capable of achieving a vertical position (as shown in FIG. 4) during cleaning of the cooker. It will be remembered that lid 6 is hingedly mounted with respect to mounting arms 11 and 12 by virtue of shaft 10 and lid lugs 9 and 9a. The lid 6 normally is maintained in a horizontal position as shown in FIG. 2 by virtue of the receipt of studs 13 and 14 within upwardly opening slots 15 and 16 in the mounting arms 11 and 12. When cam bar 47 is in its rearward unlocking and lid engaging position described with respect to FIG. 13, an upward force on handle 73 will cause the lid to shift vertically upwardly as shown in FIG. 2, by virtue of the counterbalancing mechanism. However, if the mounting arms 11 and 12 are precluded from moving upwardly, then an upward force on handle 73 will cause the lid to pivot about shaft 10, assuming its vertical position shown in FIG. 4. To this end, a mounting arm latch means is mounted on the forward face 18 of cabinet 17. The mounting arm latch means is illustrated in FIG. 4A. The mounting arm latch means comprises a bracket 118 affixed to the forward panel 18 of cabinet 17 by bolts 119, or the like. The bracket 118 has a central semi-cylindrical portion 120. The latch is completed by a rod-like member 121 formed into a U-shape. The base 122 of the member 121 is pivotally mounted in the semi-cylindrical portion 120 of bracket 118. It will be noted from FIG. 4A that the upper leg 123 of the U-shaped member 121 is longer than the lower leg 124 thereof.

In FIG. 4A, the U-shaped member 121 is shown in solid lines in its inoperative position. The member 121 can be rotated to an operative position shown in FIG. 4A in broken lines. In this position, it will be noted that the upper leg 123 of the member 121 extends across the slot 19 in the forward panel 18 of cabinet 17. As is clearly shown in FIG. 4, when the leg 123 is in its operative position across slot 19, the support arm 11 cannot shift vertically. Since the support arm 12 is mounted on the same frame as support arm 11, it too is effectively locked against vertical movement. With the latch element 121 in the position shown in broken lines in FIG. 4A, the operator need only apply a lifting force to handle 73, and the lid 6 will assume its vertical position shown in FIG. 4.

To releasably maintain the lid 6 in its vertical position shown in FIG. 4, a plate-like magnet is mounted on the inside surface of the front panel 18 of cabinet 17. The cabinet magnet is indicated in broken lines at 125 in FIG. 1. Similarly, a plate-like magnet 126 is mounted on the inside surface of panel 34 of lid cover 7. When the lid is located in the position shown in FIG. 4, the magnets 125 and 126 will coact, releasably maintaining the lid in its vertical position during the cleaning operation.

Figure 14:
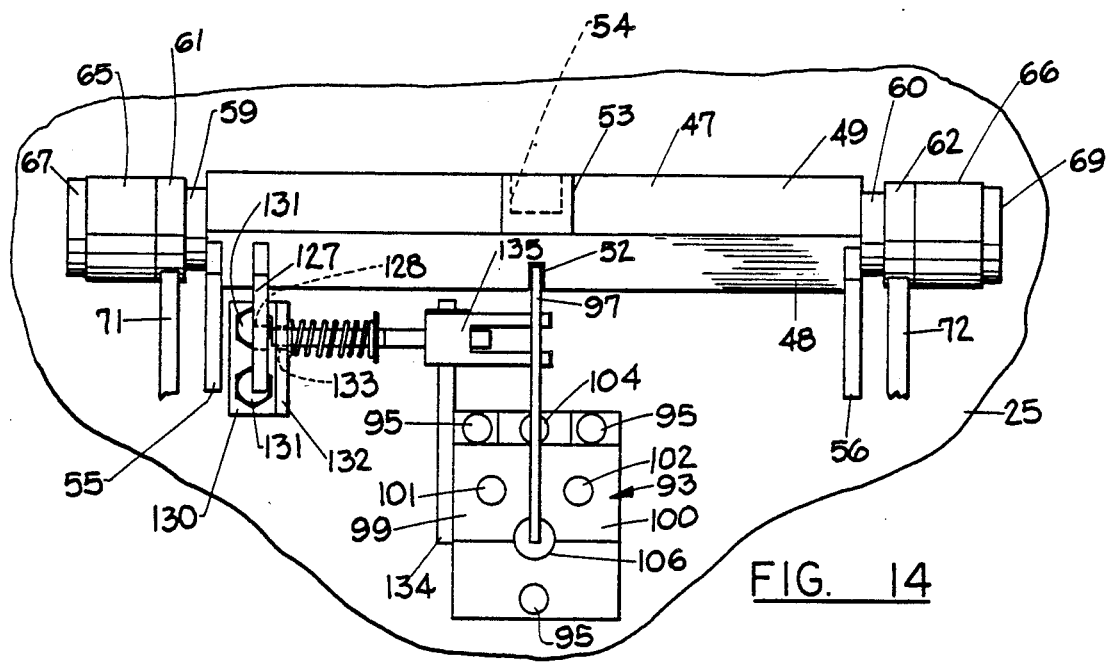
FIG. 14 is a fragmentary plan view of the cam bar and a second embodiment of the pressure-actuated cam bar latch.
Figure 15:
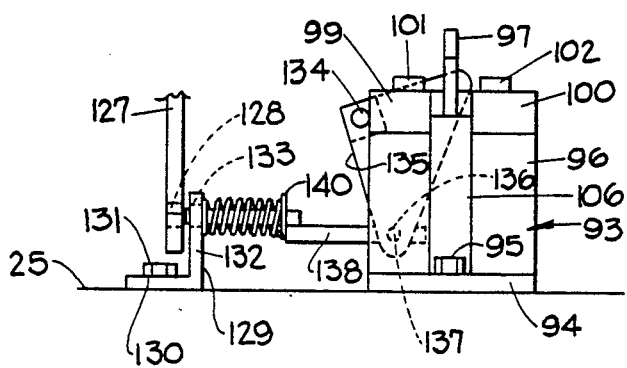
FIG. 15 is a fragmentary front elevational view of the cam bar latch of FIG. 14 in its unlatched condition.
Figure 16:
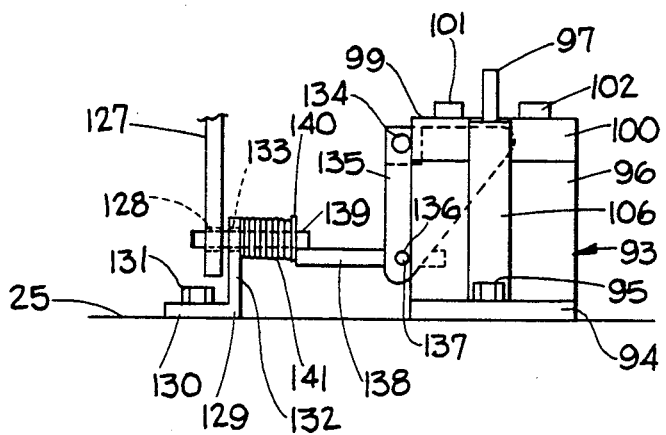
FIG. 16 is a fragmentary front elevational view of the cam bar latch of FIG. 14 in its latched position.

FIGS. 14–16 illustrate a modification to cam bar lock 93 which renders it even more positive. In FIG. 14, cam bar 47 is shown and the same index numerals have been used as were used in FIG. 6. The cam bar 47 of FIG. 14 is identical to cam bar 47 of FIG. 6 with the exception that an additional lug 127 has been mounted thereon. The lug 127 is identical to lugs 55 and 56, with the exception that it is provided with a transverse perforation 128. Adjacent the cam bar lug 127, there is mounted on the top surface 25 of lid 6 an angle bracket 129. The angle bracket 129 has a horizontal leg 130 affixed to the surface 125 by bolts 131, or the like. Angle bracket 129 has an upstanding leg 132 provided with a transverse perforation 133. When the cam bar 47 is in its forward lid-locking position as shown in FIG. 8, the perforation 128 in the cam bar lug 127 is substantially coaxial with the perforation 133 in the upstanding leg 132 of angle bracket 129.

In FIG. 14–16, the cam bar lock 93 is identical to that described above, and like parts have been given like index numerals. In this embodiment, a shaft 134 is welded to the side of block 99 of the cam bar lock 93. The shaft 134 is substantially parallel to the top surface 25 of lid 6 and extends rearwardly toward cam bar 47. At its rearward end, the shaft 134 rotatively mounts a substantially triangular, bifurcated lever 135. The pin 134 passes through a perforation in the triangular lever 134 near one of its corners. It will be apparent from the figures that another of its corners underlies locking lever 97. The third corner of lever 135 depends downwardly and the bifurcations are provided with coaxial perforations, one of which is shown at 136. The perforation 136 and its counterpart in the other bifurcation receive a transverse pin 137 mounted in a rod 138 which extends between the bifurcations. In this way, the lever 135 and the rod 138 have a pivotal relationship.

The free end of rod 138 has a second rod 139 welded thereto. The end of rod 39 opposite the welded end is supported in the perforation 133 of the upstanding leg 132 of angle bracket 129 The rod 139 supports a washer 140. Rod 139 is surrounded by a compression spring 141. One end of the compression spring 141 abuts washer 140. The other end of compression spring 141 abuts upstanding angle bracket leg 132.

It will be understood that the basic cam bar lock and its locking lever 97 function in the manner described with respect to FIGS. 8 and 9. When the locking lever 97 is in its unlocked position as illustrated in FIGS. 9, 14 and 15, the rod-like members 138 and 139 and the triangular lever 135 will be in the positions shown in FIGS. 14 and 15, their normal positions. These elements are urged to their normal positions by compression spring 141 and these positions are determined by abutment of the triangular lever against the lower edge of locking lever 97. It will be noted, that when the assembly is in its normal position, the free end of rod-like member 139 is located within perforation 133 of the angle bracket upstanding leg 132, but is clear of the perforation 128 of cam bar lug 127.

When, however, cam bar 47 is in its forward lid-locking position, and when the vat is pressurized to cause the locking lever 97 of cam bar lock 93 to move downwardly and engage the notch 52 of cam bar 47 (as described with respect to FIG. 8), the locking lever 97 will actuate the additional lock parts. Thus, downward movement of locking lever 97 will shift the triangular lever 135 and the rod-like assembly 138-139 to the position shown in FIG. 16, against the action of compression spring 141. In the position shown in FIG. 16, the rod-like element 139 passes through the perforation 128 of cam bar lug 127 positively locking the cam bar against rotative movement. When the vat 3 is unpressurized, the locking lever 97 will shift upwardly to its unlocked position, as described with respect to FIG. 9. The triangular lever 135 and the rod assembly 138-139 are then free to be moved to their unlocking position shown in FIG. 15 by compression spring 141. It would be apparent that with the locking system of FIGS. 14 through 16, the operator cannot mistakenly lift the handle 73 while the vat is pressurized, regardless of the amount of force he applies to the handle.

Modifications may be made to the invention without departing from the spirit of it.

What is claimed is:

1. A lid opening, closing and locking mechanism for a pressure cooker having a vat with an open top, a lid for said vat, and means mounting said lid for vertical movement relative to said vat top between an open position elevated with respect to said vat top and a closed position seated on said vat top, said lid having a planar top and downwardly depending forward and rearward ends and longitudinal sides, said forward and rearward ends and sides supporting a gasket adapted to form a seal with said open vat top, said mechanism comprising a pair of slotted hook arms mounted on said cooker to either side of said vat top and a cam bar in association with said lid and extending transversely thereof, said cam bar having a main body portion and end portions which extend beyond said sides of said lid, handle means operatively connected to said cam bar, said cam bar being manually shiftable by said handle means longitudinally of said lid between a forward lid locking position wherein said main body portion bears downwardly against said lid and said cam bar ends bear upwardly against the slots of said hook arms, and a rearward unlocking and lid engaging position wherein said cam bar ends are free of said hook arm slots and said cam bar is mechanically coupled to said lid so that upward and downward forces on said handle will shift said lid between its open and closed positions.

2. The lid opening, closing and locking means claimed in claim 1 wherein said main body portion of said cam bar is of non circular cross section, said handle means being shiftable between an uppermost and a lowermost position as well as longitudinally of said lid to impart rotation to said cam bar through a limited arc, said cam bar being rotatable by said handle when said cam bar is in said forward lid locking position to achieve an over-center locking orientation.

3. The lid opening, closing and locking mechanism claimed in claim 2 wherein said main body portion of said cam bar is of square cross section, said portions of said cam bar main body bearing downwardly against said lid, when said cam bar is in said forward lid locking position, being slightly rounded.

4. The lid opening, closing and locking mechanism claimed in claim 1 where in said cam bar end portions support rollers to cooperate with said hook arm slots.

5. The lid opening, closing and locking mechanism claimed in claim 1 wherein said cam bar end portions support rollers to cooperate with said hook arm slots, inward of its roller each cam bar end portion has a portion to which an elongated arm is affixed, said arms terminating in free ends joined together by a bar-like member in parallel spaced relationship to said cam bar, said bar-like member comprising said handle.

6. The lid opening, closing and locking mechanism claimed in claim 1 including a lug located centrally of said main body portion of said cam bar, said lug having a slot formed therein, a narrow C-channel, said C-channel having a vertically oriented base terminating in upper and lower legs extending forwardly of said lid, said lower leg being affixed to said planar top of said lid centrally thereof, said C-channel being so positioned on said lid top that said upper leg of said C-channel is received in said cam bar lug slot when said cam bar is in its rearward unlocking and lid engaging position, said C-channel comprising a mechanical coupling between said cam bar and said lid.

7. The lid opening, closing and locking mechanism claimed in claim 1 including a cover mounted on said lid, said cover comprising a pair of trapezoidal shaped sides joined by an upwardly and rearwardly sloped front panel, an upwardly and forwardly sloped rear panel and a series of top panels one of which is removable, said top panels being in parallel spaced relationship to said planar lid top, said cover sides each having an elongated window formed therein, said cam bar being located within said cover with its end portions extending through said cover windows.

8. The lid opening, closing and locking mechanism claimed in claim 7 wherein said cam bar end portions support rollers to cooperate with said hook arm slots, inboard of its roller each cam bar end portion has a portion located outside said cover to which an elongated arm is affixed, said arms extending forwardly with respect to said lid and terminating in free ends joined together by a bar-like member in parallel spaced relationship to said cam bar, said bar-like member comprising said handle.

9. The lid opening, closing and locking means claimed in claim 8 wherein said main body portion of said cam bar is of non-circular cross section, said handle means being shiftable between an uppermost and a lowermost position as well as longitudinally of said lid to impart rotation to said cam bar through a limited arc, said cam bar being rotatable by said handle when said cam bar is in said forward lid locking position to achieve an over-center locking orientation.

10. The lid opening, closing and locking means claimed in claim 9 wherein said main body portion of said cam bar is of non-circular cross section, said handle means being shiftable between an uppermost and a lowermost position as well as longitudinally of said lid to impart rotation to said cam bar through a limited arc, said can bar being rotatable by said handle when said cam bar is in said forward lid locking position to achieve an over-center locking orientation.

11. The lid opening, closing and locking mechanism claimed in claim 10 including a pair of upstanding lugs affixed to said cam bar near the ends of said main body portion thereof, said lugs being positioned to abut the inside surface of said lid cover to determine the uppermost position of said handle means.

12. The lid opening, closing and locking mechanism claimed in claim 10 wherein said main body portion of said cam bar is of square cross section, said portions of said cam bar main body bearing downwardly against said lid, when said cam bar is in said forward lid locking position, being slightly rounded.

13. The lid opening, closing and locking mechanism claimed in claim 12 including a lug located centrally of said main body portion of said cam bar, said lug having a slot formed therein, a narrow C-channel, said C-channel having a vertically oriented base terminating in upper and lower legs extending forwardly of said lid, said lower leg being affixed to said planar top of said lid centrally thereof, said C-channel being so positioned on said lid top that said upper leg of said C-channel is received in said cam bar lug slot when said cam bar is in its rearward unlocking and lid engaging position, said C-channel comprising a mechanical coupling between said cam bar and said lid.

14. The lid opening, closing and locking mechanism claimed in claim 13 including guide means on said lid top for said cam bar as it is shifted between its forward lid locking position and its rearward unlocking and lid engaging position.

15. The lid opening, closing and locking mechanism claimed in claim 14 including a cam bar latch, said cam bar latch being actuated by pressure within said vat from a normal unlocking position in the absence of pressure in said vat to a locking position in the presence of pressure within said vat, said cam bar latch engaging said cam bar in said locking position to preclude shifting of said cam bar from its forward lid locking position while said vat is pressurized.

16. The lid opening, closing and locking mechanism claimed in claim 15 wherein said cam bar lock comprises an upstanding member having a plate-like bottom affixed to said lid top centrally thereof and forward of said cam bar when in its forward lid locking position, a locking lever pivotally mounted on said upstanding member and having a rearward end extending toward said cam bar and an oppositely extending forward end, said locking lever being swingable between a substantially horizontal locking position and an upwardly sloped unlocking position, a first compression spring mounted on said upstanding member and abutting said locking lever so as to bias said locking lever to its unlocked position, said lid having a planar metallic liner supported beneath and parallel to said lid top by said downwardly depending lid forward and rearward ends and sides, a plunger extending through perforations in said plate-like base of said cam bar lock and said lid top and terminating in an abutment means contacting said lid liner, said plunger being surrounded by a compression spring having a first end abutting the inside surface of said lid top and a second end seated against said abutment means, the upper end of said plunger contacting the forward end of said locking lever, said plunger having a normal lower position when said lid liner is planar and with said locking lever in its unlocked position, said plunger having an actuated upper position when said lid liner is bulged upwardly when said vat is pressurized shifting said locking lever to its locking position, said cam bar having a notch aligned with said locking lever when said cam bar is in its forward lid locking position, the rearward end of said locking lever engaging said notch when said locking lever is in its locking position to prevent shifting of said cam bar from its forward lid locking position when said vat is pressurized.

17. The lid opening, closing and locking mechanism claimed in claim 16 including a plate-like lug affixed to said cam bar and an angle bracket having an upstanding leg affixed to said lid top, said cam bar lug and said angle bracket upstanding leg lying adjacent each other and having transverse holes therethrough which are coaxial when said cam bar is in its forward lid locking position, a rod mounted on the side of said cam bar lock upstanding member, said rod extending toward said cam bar and being parallel to said lid top, a triangular lever having three corners, said triangular lever being pivotally affixed to said rod at a first one of its corners, a second one of its corners underlying and abutting said locking lever, a third one of its corners being pivotally attached to one end of a rod-like locking bolt assembly, said locking bolt assembly having a free end supported in the transverse perforation of said angle bracket upstanding leg, said locking bolt assembly supporting a washer, a compression spring surrounding said locking bolt assembly between said washer and said upstanding angle bracket leg maintaining said triangular lever second corner in contact with said locking lever, when said locking lever is in it its unlocking position said locking bolt assembly is in its normal unlocking position with the free end of said bolt assembly supported in said perforation in said angle bracket upstanding leg, when said cam bar is in its forward lid locking position and when said vat is pressurized so that said locking lever is in its locking position by virtue of said plunger, the free end of said bolt assembly extends through said perforation in said angle bracket leg and said perforation in said cam bar lug positively locking said cam bar in its forward lid locking position.

18. The lid opening, closing and locking mechanism claimed in claim 1 including guide means on said lid top for said cam bar as it is shifted between its forward lid locking position and its rearward unlocking and lid engaging position.

19. The lid opening, closing and locking mechanism claimed in claim 1 including a cam bar latch, said cam bar latch being actuated by pressure within said vat from a normal unlocking position in the absence of pressure in said vat to a locking position in the presence of pressure within said vat, said cam bar latch engaging said cam bar in said locking position to preclude shifting of said cam bar for its forward lid locking position while said vat is pressurized.

20. The lid opening, closing and locking mechanism claimed in claim 19 wherein said cam bar lock comprises an upstanding member having a plate-like bottom affixed to said lid top centrally thereof and forward of said cam bar when in its forward lid locking position, a locking lever pivotally mounted on said upstanding member and having a rearward end extending toward said cam bar and an oppositely extending forward end, said locking lever being swingable between a substantially horizontal locking position and an upwardly sloped unlocking position, a compression spring mounted on said upstanding member and abutting said locking lever so as to bias said locking lever to its unlocked position, said lid having a planar metallic liner supported beneath and parallel to said lid top by said downwardly depending lid forward and rearward ends and slides, a plunger extending through perforations in said plate-like base of said cam bar lock and said lid top and terminating in an abutment means contacting said lid liner, said plunger being surrounded by a compression spring having a first end abutting the inside surface of said lid top and a second end seated against said abutment means, the upper end of said plunger contacting the forward end of said locking lever, said plunger having a normal lower position when said lid liner is planar and with said locking lever in its unlocked position, said plunger having an actuated upper position when said lid liner is bulged upwardly when said vat is pressurized shifting said locking lever to its locking position, said cam bar having a notch aligned with said locking lever when said cam bar is in its forward lid locking position, the rearward end of said locking lever engaging said notch when said locking lever is in its locking position to prevent shifting of said cam bar from its forward lid locking position when said vat is pressurized.

21. The lid opening, closing and locking mechanism claimed in claim 20 including a plate-like lug affixed to said cam bar and an angle bracket having an upstanding leg affixed to said lid top, said cam bar lug and said angle bracket upstanding leg lying adjacent each other and having transverse holes therethrough which are coaxial when said cam bar is in its forward lid locking position, a rod mounted on the side of said cam bar lock upstanding member, said rod extending toward said cam bar and being parallel to said top, a triangular lever having three corners, said triangular lever being pivotally affixed to said rod at a first one of its corners, a second one of its corners underlying and abutting said locking lever, a third one of its corners being pivotally attached to one end of a rod-like locking bolt assembly, said locking bolt assembly having a free end supported in the transverse perforation of said angle bracket upstanding leg, said locking bolt assembly supporting a washer, a compression spring surrounding said locking bolt assembly between said washer and said upstanding angle bracket leg maintaining said triangular lever second corner in contact with said locking lever, when said locking lever is in it its unlocking position said locking bolt assembly is in its normal unlocking position with the free end of said bolt assembly supported in said perforation in said angle bracket upstanding leg, when said cam bar is in its forward lid locking position and when said vat is pressurized so that said locking lever is in its locking position by virtue of said plunger, the free end of said bolt assembly extends through said perforation in said angle bracket leg and said perforation in said cam bar lug positively locking said cam bar in its forward lid locking position.

22. The lid opening, closing and locking mechanism claimed in claim 1 wherein said means mounting said lid for vertical movement comprises a vertically oriented cabinet mounted at the rear of said pressure cooker and extending thereabove, said cabinet having a front panel with a pair of vertical slots therein, a pair of counterbalanced support arms extending forwardly fo said panel through said slots and capable of vertical movement relative to said vat top, said rearward end of said lid having a pair of perforated lugs rotatably journaled on a shaft extending between and affixed to said support arms, a laterally extending stud mounted on each of said lid sides and receivable in an upwardly opening slot in the adjacent one of said support arms and positioned to maintain said lid horizontally oriented, said lid and said support arms being shiftable vertically by said handle of said cam bar, when said cam bar is in its rearward unlocked and lid engaging position, to open and close said lid with respect to said vat top, means to lock said support arms to preclude their vertical movement, said lid being pivotable by said handle between a horizontal position and a vertical position parallel to and adjacent said cabinet front panel when said cam bar is in its rearward unlocking and lid engaging position and said support arms are locked to preclude their vertical movement, magnet means mounted on said lid and magnet means mounted behind said cabinet front panel, said magnet means being opposed when said lid is in said vertical orientation and coacting to releaseably maintain said lid in said vertical position.

* * * * *

UNITED STATES PATENT AND TRADEMARK OFFICE
CERTIFICATE OF CORRECTION

PATENT NO. : 4,997,101

DATED : March 5, 1991

INVENTOR(S) : James D. King and Stephen D. Werts

It is certified that error appears in the above-identified patent and that said Letters Patent is hereby corrected as shown below:

```
Claim 19 - Line 57 - Column 16 - "for" should be deleted
and replaced by -- from --

Claim 20 - Line 7 - Column 17 - "slides" should be deleted
and replaced with -- sides --
```

Signed and Sealed this

Eighth Day of December, 1992

Attest:

DOUGLAS B. COMER

*Attesting Officer*  *Acting Commissioner of Patents and Trademarks*